3,100,224
Patented Aug. 6, 1963

3,100,224
PROCESS FOR MAKING 1,4-DICAFFEYLQUINIC ACID
Luigi Panizzi, Rome, and Alberto Vercellone, Milan, Italy, assignors to Società Farmaceutici Italia, Milan, Italy, a corporation of Italy
No Drawing. Filed May 24, 1955, Ser. No. 510,866
Claims priority, application Italy May 28, 1954
4 Claims. (Cl. 260—473)

The present invention relates to caffeic esters of quinic acid and to methods of preparing these esters and intermediaries thereof.

Quinic acid may be found in various plants, cinchona bark being a particularly good source. The compound has the following structural formula:

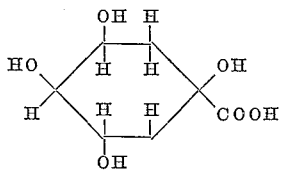

Being a gamma-oxyacid, quinic acid forms a lactone, called quinide

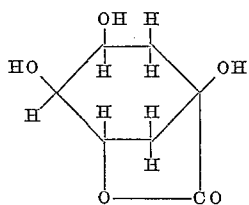

It is the principal object of the present invention to produce a new class of compounds, namely caffeic esters and particularly caffeic diesters of quinic acid and quinide of the general formula

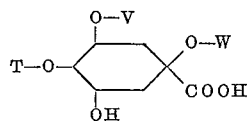

or

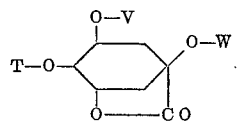

wherein T, V, W represent hydrogen and at least one of them represents

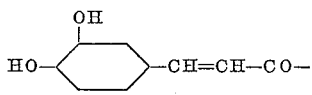

Compounds of this type have a pronounced physiological effect. More particularly, they were found to be energetic stimulants of biliary secretion and of cholesterol metabolism.

It is, therefore, another object of the present invention to provide compounds of this type for attaining said physiological effects.

As an additional object, the present disclosure relates to the method of preparing such compounds.

The method is substantially based on a condensation reaction between a caffeic acid derivative (I) of the type

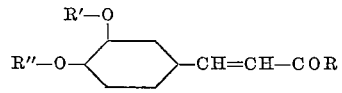

wherein R represents chlorine or

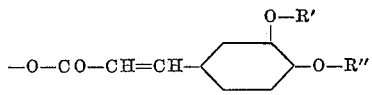

and R', R" individually represent carbomethoxy, carboethoxy and carbobenzoxy, namely

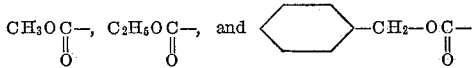

and jointly represent —CO—, with quinide or one of its 4,5-alkylidene derivatives (particularly the isopropylidene derivative) of the type

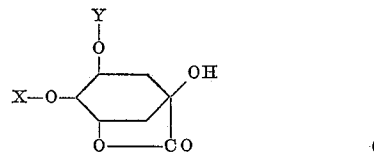

wherein X, Y individually represent hydrogen and jointly represent alkylidene (isopropylidene), to obtain intermediates of the general formula

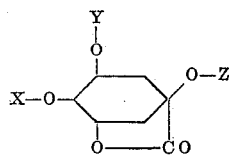

wherein X, Y, Z individually represent

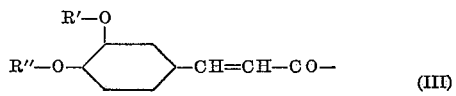

X and Y jointly represent alkylidene (isopropylidene)

while Z represents

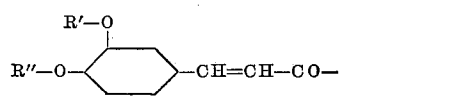

or X, Z individually represent

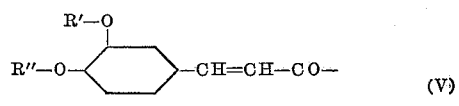

while Y represents hydrogen.

From these intermediates, the following compounds can be obtained, depending on the type of selective saponification employed; from III and from V 1,4-dicaffeylquinic acid and from IV 1-caffeylquinide or 1-dicarboalkyloxycaffeylquinide. The latter, upon further acylation with caffeic acid derivatives of the type I, and selective saponification as in the case of the derivatives III and IV, yields 1,4-dicaffeylquinic acid.

The condensation can be carried out by mixing 1 to 3 mols of the acyl derivative I with 3 to 1 mols of II and heating the mixture for fifteen to ninety minutes to 110–180° C.; or adding to the mixture of I and II, at a temperature between 0 and 100° C. and in the absence or presence of an inert solvent (such as dioxan, or an ethylene glycol dimethyl or diethyl-ether), a tertiary base, such as pyridine, triethylamine, ethylpiperidine, dimethylaniline, etc., or an alkali or alkali-earth carbonate, bicarbonate, oxide or hydroxide in at least stoichiometric amounts. The acyl-derivatives (chlorides) that are necessary for the above-described condensations are obtained by chlorinating acylcaffeic acids having an acyl radical that is easily separated in the final stage of selective saponification which may be carried out with thionyl chloride, phosphorus pentachloride, oxalyl chloride, phosphorus trichloride or phosphorus oxychloride without or with an inert solvent, such as benzene, toluene, ligroin, etc., and at temperatures varying from 40 to 140° C. Very suitable for this purpose are the carbomethoxy, carboethoxy and carbobenzoxy derivatives as well as the carbonic ester.

The afore-mentioned chlorides can be used for the preparation of the corresponding anhydrides by heating an equimolar mixture of chloride and of the respective acid until fusion takes place.

The acyl-derivatives of the free caffeic acid, necessary for preparing the chlorides and anhydrides I, are obtained from the chlorides or anhydrides of the acids selected for acylating the phenolic hydroxyls, by reacting them with caffeic acid (under anhydrous conditions in the presence or absence of a tertiary base, or in an aqueous environment in the presence of an alkali).

In order to obtain the caffeic esters that are the object of the present invention, the selective saponifications of the intermediates represented by the general Formulas III, IV and V are carried out in the following manner:

(1) 1,4-dicaffeylquinic acid is obtained from compounds III and V as a result of eliminating the acyl radicals R' and R'' and the caffeic radical in position 5 by means of treating with a 3% barium hydroxide solution, in the absence of air and between 0 and 130° C. for a period from one to forty hours.

(2) 1-dicarboalkyloxycaffeylquinide is obtained from IV by means of treating with dilute mineral acids in the cold (between 0 and 20° C.) or with aqueous acetic acid upon heating (between 80 and 100°).

(3) 1-caffeylquinide is obtained from IV either directly by heating with water or by treating first with dilute mineral acids in the cold and then with a 3% barium hydroxide solution as indicated in (1).

It has been found that, if 1 to 3 mols of acyl-derivative I are condensed with 3 to 1 mols of quinide II (wherein both X and Y are hydrogen) or with the dicarboalkoxycaffeyl derivative thereof, after a selective alkaline saponification with barium hydroxide, 1,4-dicaffeylquinic acid is obtained in all cases.

The following examples are presented to illustrate the present invention, but not to restrict the scope thereof:

*Example 1*

18 g. of caffeic acid, suspended in 500 cc. of water, are dissolved by adding sodium bicarbonate and stirring for an extended period of time. The solution is cooled to 2-3° C. and then, while stirring continuously, 20 g. of phosgene dissolved in 200 cc. of chloroform are added in four to five portions. After acidifying by cautiously adding iced HCl (1:1), the solution is filtered and the collected precipitate is washed with water. Upon crystallization from glacial acetic acid, the carbonylcaffeic acid thus obtained melts at 238-240° C. with decomposition.

5 g. of carbonylcaffeic acid are suspended in 70 cc. of ligroin (B.P. 120-140° C.). After adding 6 g. of phosphorus pentachloride and avoiding access of moisture while frequently stirring, the suspension is refluxed by boiling slowly and gently until everything is dissolved except a small amount of reddish, resinous materials that adhere to the bottom. While still nearly boiling, the solution is rapidly decanted into another flask containing 1 g. of phosphorus pentachloride and the whole is refluxed gently for about fifteen to thirty minutes, after which time evolution of hydrochloric acid ceases. The clear and practically colorless solution is left to cool on air for one to two hours, and then, operating rapidly, the substance that separated in the form of bright, micaceous scales is filtered off with the aid of a filtering pump, washed with low-boiling ligroin and dried under vacuum at room temperature for about one-half to one hour. The carbonylcaffeic-acid chloride thus prepared melts at 118-120° C.

5.5 g. of carbonylcaffeic-acid chloride are thoroughly mixed with 12.8 g. of dry, powdered quinide in a flask immersed in an oil bath. The flask is put under vacuum and is heated first to 120° C. and then, slowly, to about 160° C., maintaining this temperature for about twenty to thirty minutes. The molten mass is left to cool under vacuum and then it is crushed in a mortar in the presence of water. The material thus obtained is placed on a filter and washed several times with water. The cake is dissolved in dioxan, while slightly heating if necessary. 400 cc. of a cold, 3% barium hydroxide solution are added to this solution, while cooling with ice water and stirring vigorously (in order to exclude access of air, it is advisable to work in a nitrogen atmosphere). The solution is left standing insulated from contact with air for twelve hours, whereupon the content is rapidly acidified and concentrated in vacuo, on a water bath, to a volume of about 80-100 cc. After cooling and standing, well protected from contact with air, the brown material which separates is filtered off and purified by crystallization from 50% acetic acid, using a minimum quantity of charcoal for decolorizing. 1,4-dicaffeylquinic acid is obtained, melting at 226-228° C. with decomposition, $(\alpha)_D = -68° \pm 1°$ (c.=2.0; ethanol).

*Example 2*

A mixture of 3.15 g. of dicarbomethoxycaffeic-acid chloride and 0.90 g. of quinide is treated with 15 cc. of anhydrous pyridine and kept on a boiling water bath for one hour. Almost all of the pyridine is evaporated under reduced pressure and, after cooling, an excess of cold dilute hydrochloric acid is added, while stirring thoroughly. After standing, the liquid is decanted from the solids and the latter are washed several times by decantation, first with hydrochloric acid and then with water. The soft residual mass is dissolved in dioxan and poured into 200 cc. of a cold, 3% barium hydroxide, while stirring and working under a nitrogen atmosphere. Proceeding as described in Example 1, 1,4-dicaffeylquinic acid is obtained, having a M.P. of 225-226° C.

*Example 3*

0.75 g. of quinide are dissolved in 10 cc. of anhydrous pyridine, then 2 g. of carbonylcaffeic-acid chloride are added to the solution which is kept on a boiling water bath for one hour. Upon evaporating pyridine under vacuum, a mass is obtained which, after repeated washing with dilute hydrochloric acid and water, is dissolved in dioxan and added to 180 cc. of a 3% barium hydroxide solution while taking the usual precautions. Proceeding as described in Example 1, 1,4-dicaffeylquinic acid is obtained having a M.P. of 226-227° C.

*Example 4*

3.5 g. of carbonylcaffeic-acid chloride are thoroughly mixed with 3.5 g. of acetone quinide and the mass is heated to 125° C. within a period of about thirty minutes, under vacuum and on an oil bath. The yellow-brown, vitreous mass obtained thereby is suspended in water and refluxed for about one-half to three-quarters hour, whereby the product substantially completely dissolves. The solution is concentrated, filtered hot and vacuum-concentrated to a small volume. After cooling, the liquid is filtered, and separated 1-caffeylquinide is washed with water. The product is purified by crystallization from boiling water; slightly yellowish, white needles are obtained that melt at 207-210° C. without decomposition $(\alpha)_D = -22° \pm 0.5°$ (c.=2.0; ethanol).

*Example 5*

A thorough mixture of 2.9 g. of dicarbomethoxycaffeic acid and 2.9 g. of its chloride, both very dry, is heated slowly on an oil bath under reduced pressure, until the temperature of the bath has reached 140-160° C. The molten mass is kept at this temperature until substantially no more gas bubbles evolve therefrom. After cooling, the vitreous mass is dissolved in boiling benzene, decolorized with charcoal, if necessary, and left standing in order to crystallize the desired dicarbomethoxycaffeic anhydride, which melts at 154-155° C. By condensing the product with quinide according to the procedure of Example 1, 1,4-dicaffeylquinic acid is obtained, melting at 223-225° C. with decomposition.

*Example 6*

3.0 g. of dicarbomethoxycaffeic-acid chloride are mixed with 2.2 g. of acetone quinide and are heated slowly on an oil bath and under slight vacuum to 140° C. The molten mass is dissolved in 25 cc. of 80% acetic acid; the solution is kept at 100° C. for 1.5 hours and is then evaporated under vacuum to dryness. The residue is dissolved in ethyl acetate and washed first with a sodium bicarbonate solution and then with water. The resulting solution is dried over sodium sulfate. By evaporating the solution, 1-dicarbomethoxycaffeylquinide is obtained in the form of a vitreous mass which is soluble in chloroform and in acetic acid but is scarcely soluble in water.

2.7 g. of 1-dicarbomethoxycaffeylquinide are mixed with 1.9 g. of dicarbomethoxycaffeic-acid chloride and heated under vacuum to 140-160° C. The molten mass is subjected to the saponification treatments described in Example 1. 1,4-dicaffeylquinic acid is obtained, having a M.P. of 224-226° C.

We claim:
1. The process which comprises condensing a caffeic acid derivative of the type

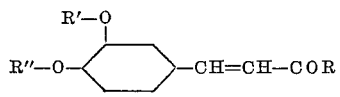

wherein R represents chlorine and

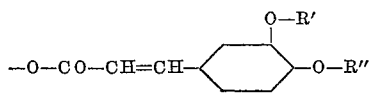

and R', R'' individually represent

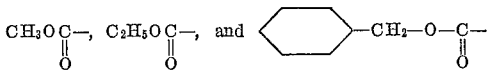

and jointly represent carbonyl, with quinide and saponifying the condensation product with a 3% barium hydroxide solution in the absence of air and at a temperature from 0 to 30° C., and separating 1,4-dicaffeylquinic acid.

2. The process defined in claim 1, said caffeic acid derivative being carbonyl caffeic acid chloride.

3. The process defined in claim 1, said caffeic acid derivative being dicarbomethoxy caffeic acid chloride.

4. The process defined in claim 1, said caffeic acid derivative being dicarbomethoxy caffeic anhydride.

References Cited in the file of this patent

UNITED STATES PATENTS

| | | |
|---|---|---|
| 2,007,642 | De Simo | July 9, 1935 |
| 2,013,318 | Rosenstein | Sept. 3, 1935 |
| 2,020,298 | Carothers | Nov. 12, 1935 |
| 2,246,599 | Oxley | June 24, 1941 |
| 2,397,630 | Strain | Apr. 2, 1946 |
| 2,918,477 | Alberti et al. | Dec. 22, 1959 |

OTHER REFERENCES

Fischer et al.: Berichte, 46, pp. 4035-6 (1913).
Beilstein: Handbuch der Org. Chem., vol. X (1927), p. 438.
Josephson: Berichte, 60, pp. 2270-72 (1927).
Josephson: Berichte, 61, pp. 911-17 (1928).
Beilstein: Handbuch der Org. Chem., vol. XIX, 1st Supp., p. 757 (1934).
Karrer: Org. Chem., 3rd Ed. (1947), pp. 211-13, Elsevier Pub. Co., N.Y.
Beilstein: Handbuch der Org. Chem., vol. X, 2nd Supp., p. 378 (1949).
Wagner-Zook: "Synthetic Org. Chem.," pp. 546-7; 558-9, John Wiley and Sons, N.Y. (1953).
L. Panizzi et al.: Gazzetta Chimica Italiana, vol. 84, pages 798-805; pages 806-815, August 1954.